United States Patent [19]

Contois

[11] 4,350,751

[45] Sep. 21, 1982

[54] HIGH RESOLUTION HETEROGENEOUS PHOTOCONDUCTIVE COMPOSITIONS AND METHOD OF PREPARING

[75] Inventor: Lawrence E. Contois, Webster, N.Y.

[73] Assignee: Eastman Kodak Company, Rochester, N.Y.

[21] Appl. No.: 280,199

[22] Filed: Jul. 6, 1981

Related U.S. Application Data

[63] Continuation of Ser. No. 111,428, Jan. 11, 1980, abandoned.

[51] Int. Cl.$^3$ .............................................. G03G 5/06
[52] U.S. Cl. ............................. 430/135; 430/73; 430/75; 430/80; 430/83
[58] Field of Search .................... 430/73, 75, 80, 135, 430/83

[56] References Cited

U.S. PATENT DOCUMENTS

| | | | |
|---|---|---|---|
| 3,615,396 | 10/1971 | Gramza et al. .................... | 430/83 X |
| 3,615,414 | 10/1971 | Light .................................. | 430/75 X |
| 3,615,415 | 10/1971 | Gramza ............................. | 430/134 |
| 3,615,418 | 10/1971 | Standenmayer et al. ........ | 430/75 X |
| 3,973,962 | 8/1976 | Contois et al. ..................... | 430/75 |

*Primary Examiner*—Roland E. Martin, Jr.
*Attorney, Agent, or Firm*—Torger N. Dahl

[57] ABSTRACT

A plurality of aggregate photoconductive particles having a predominant particle size of less than about 1.0 micron are disclosed. Such particles are useful in heterogeneous photoconductive compositions, electrophotographic elements and electrophotographic imaging processes.

3 Claims, No Drawings

HIGH RESOLUTION HETEROGENEOUS PHOTOCONDUCTIVE COMPOSITIONS AND METHOD OF PREPARING

This is a continuation of application Ser. No. 111,428, filed Jan. 11, 1980, now abandoned.

FIELD OF THE INVENTION

This invention relates to aggregate photoconductive particles and to heterogeneous photoconductive compositions and elements prepared from such particles. In particular, this invention relates to aggregate photoconductive particles from which heterogeneous photoconductive compositions and elements capable of high resolution can be prepared.

BACKGROUND OF THE INVENTION

Electrophotographic imaging compositions, elements and processes are extensively described in technological literature, including patents. Generally, such compositions and elements are used in processes wherein the photoconductive element comprising a coated layer of a photoconductive composition, is image-wise exposed to activating radiation. A latent electrostatic charge image is formed on the coated layer. The charge image is developed and fixed, thereby forming a permanent record of the image.

Heterogeneous, "aggregate" photoconductive compositions and layers are useful in electrophotographic processes. Such photoconductive compositions are described in detail in U.S. Pat. No. 3,615,415, granted to Light on Oct. 26, 1971 and U.S. Pat. No. 3,679,408 granted to Kryman et al, July 25, 1972. In general, such a heterogeneous photoconductive composition is multiphase, comprising a continuous phase of an electrically insulating polymeric binder having dispersed therein a particulate discontinuous phase referred to as aggregate photoconductive particles. Heterogeneous, aggregate compositions may optionally include one or more organic photoconductors dissolved in the continuous phase. The aggregate photoconductive particles are co-crystalline complexes of a pyrylium dye and a polymeric material. Heterogeneous, aggregate compositions are capable of high speeds and very high image quality. The aggregate photoconductive particle size varies from about 0.01 to about 25 microns. The predominant particle size in such compositions is typically greater than about 2 microns. This relatively large particle size impairs the high resolution capabilities of heterogeneous, aggregate photoconductive compositions. However the art does not teach a method for making aggregate photoconductive compositions having smaller particles in a narrower particle size distribution. Such compositions would have greater resolution capability and are therefore desirable.

SUMMARY OF THE INVENTION

The present invention provides a plurality of aggregate photoconductive particles having a predominant particle size of less than about 1.0 micron. By predominant, I mean that over 50% of the particles have a size less than 1 micron. Such particles are combined with an electrically insulating polymer to form heterogeneous photoconductive compositions having improved resolution capability.

In one aspect of the present invention the predominant aggregate particle size is less than about 0.5 micron.

In another aspect of the present invention aggregate particle size is in the range of about 0.5 to about 2.0 microns with no particles having a size greater than 3.0 microns and the predominant particle size is less than about 1.0 micron.

In a preferred embodiment the present invention provides a plurality of aggregate particles having a predominant particle size as described above and wherein said particle comprises a pyrylium dye, (including pyrylium and thiopyrylium dyes) and an aggregating polymer having repeating units according to the structure:

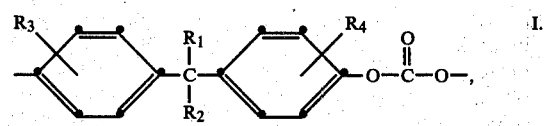

wherein:

$R_1$ and $R_2$, taken separately, are the same or different and represent hydrogen or alkyl; or $R_1$ and $R_2$ taken together, represent the carbon atoms necessary to form a cyclic hydrocarbon radical having up to 14 ring carbon atoms; and $R_3$ and $R_4$ represent hydrogen or alkyl;

provided that when $R_1$ and $R_2$ are both methyl, $R_3$ and $R_4$ must both be alkyl.

In another embodiment the present invention provides a heterogeneous photoconductive composition comprising a plurality of aggregate photoconductive particles having a predominant particle size of less than about 1.0 micron ($\mu$) dispersed in a blend of electrically insulating polymers. The blend consists of:

(a) from about 0.1 to about 50.0 weight percent of an aggregating polymer having a structure according to Formula I; and (b) from about 50.0 to about 99.9 weight percent of a non-aggregating polymer effective to reduce particle size and particle size distribution of the aggregate particles formed in said blend.

In a preferred embodiment of the above heterogeneous photoconductive compositions the polymeric blend consists of:

(a) from about 50.0 to about 99.9 weight percent of a non-aggregating polymer selected from the group consisting of poly-[4,4'-(hexahydro-4,7-methanoindan-5-ylidene)diphenyl terephthalate]; poly[4,4'-isopropylidene bis(phenyleneoxy-p-phenylene)sulfone]; polystyrene; poly(4,4'-isopropylidene bis-phenoxyethyl-co-ethylene terephthalate); halogenated polyethylene; poly(vinylchloride-vinylidene chloride; poly[4,4'-(1-phenyl-2,2,2-trifluoroethylidene)diphenylene carbonate]; polyvinyl acetate; poly(alkylmethacrylate) and poly(vinylacetate-co-crotonic acid) and poly(N-vinylcarbazole); and (b) from about 0.1 to about 10 weight percent of an aggregating polymer selected from the group consisting of poly[4,4'-(2-norbornylidene)diphenylene carbonate]; poly[4,4'-(hexahydro-4,7-methanoindan-5-ylidene)diphenylene carbonate]; and poly(4,4'-cyclohexylidene diphenylene carbonate).

DETAILED DESCRIPTION OF THE INVENTION

Applicant will now describe in more detail various aspects of the invention, including composition components, methods of making the aggregate particles and heterogeneous photoconductive compositions. A comparison of the aggregate particle sizes and the particle size distribution of the present invention with the sizes and size distribution of previously disclosed aggregate particles is presented. Electrophotographic elements comprising the above described heterogeneous compositions and a typical method of imaging such elements will also be described.

The polymeric blend forming the binder component of the heterogeneous photoconductive composition of the present invention contains (a) a "non-aggregating polymer" and (b) an "aggregating polymer". Without being limited by any theory as to the mechanism of the present invention, it is believed that the aggregating polymer interacts in some fashion with the thiopyrylium dye to promote formation of aggregate particles. The non-aggregating polymer, on the other hand, acts to retard the rate at which such aggregate particles form. The net result is small aggregate particles having a narrower aggregate particle size distribution than has been obtainable heretofore.

Although a number of the polymers useful herein have been disclosed as useful in heterogeneous aggregate photoconductive compositions in the aforementioned Light et al and Kryman et al patents, neither of these patents teach, expressly or implicitly, that aggregate particle size distribution can be reduced through the use of the polymeric blends disclosed herein.

Both the aggregating and the non-aggregating polymers are electrically insulating film forming materials. Such polymers are also characterized by an inherent viscosity of about 0.25 to about 2.0 as measured in 1,2-dichloroethane at a concentration of 0.25 g/100 ml and a temperature of about 25° C. Any polymer which has the above characteristics and which does not promote aggregation may be used as the non-aggregating polymer. Non-aggregating polymers include the following materials:

(a) poly[4,4'-alkylidene bis(aryleneoxy-p-arylene)sulfones];

(b) addition polymers and copolymers having pendant from at least about 10% of the repeating units thereof a group selected from the class consisting of aryl, alkyl, acetate, aryl substituted acetals, halogen, halobenzoate, hydroxyl, and carboxyl, the aforesaid repeating units being derived from a compound having a polymerizable ethylenically unsaturated alkylene group containing about two to four carbon atoms;

(c) polymers and copolymers having at least about 10% of the repeating units comprising a photoconductive component selected from the group consisting of substituted and unsubstituted carbazoles and substituted and unsubstituted triarylamines;

(d) poly(4,4'-alkylidene-bis-2,2',6,6'-tetrahalo diarylene carbonates);

(e) polyester polymers and copolymers derived from one or more aryldicarboxylic acids and one or more polyols selected from the group consisting of alkylene glycols, 4,4'-alkylidenediarylenediols, 4,4'-alkylidenediaryleneoxyalkylenediols, 4,4'-polycycloalkylidenediarylenediols, and 4,4'-polycycloalkylidenediaryleneoxyalkylenediols including esters of such acids and polyols; and (f) poly[4,4'-(1-phenyl-2,2,2-trifluoroethylidene)-diphenylene carbonates].

Alkyl and alkylene, unless stated otherwise, refer to moieties having from 1-4 carbon atoms such as methyl and propyl. Halogen and halogenated refer to chlorine, bromine and fluorine. Aryl and arylene refer to phenyl or naphthyl and phenylene or naphthylene, respectively. Polycycloalkylidene refers to a saturated hydrocarbon ring of up to 19 carbon atoms such as norbornylidene and methanoindarylidene.

Table I presents a partial listing of representative non-aggregating polymers used in the blends of the invention.

TABLE I 1. poly(4,4'-hexahydro-4,7-methanoindan-5-ylidene diphenyl terephthalate)
2. poly[4,4'-isopropylidene bis(phenyleneoxy-p-phenylene)sulfone]
3. polystyrene
4. poly(4,4'-isopropylidenebisphenoxyethyl-co-ethylene terephthalate)
5. poly(styrene-co-butadiene)
6. poly(methyl methacrylate)
7. poly(ethyl methacrylate)
8. poly(t-butyl methacrylate)
9. poly(ethylene-co-neopentyl terephthalate)
10. poly(ethylene-co-neopentyl isophthalate-co-terephthalate)
11. poly(vinyl butyral-co-vinyl acetate-co-vinyl alcohol)
12. poly(vinyl alcohol-co-vinyl-o-chlorobenzal)
13. chlorinated polyethylene
14. poly(chlorotrifluroethylene)
15. poly(4,4'-isopropylidene-2,2',6,6'-tetrachlorodiphenylene carbonate)
16. poly(vinyl m-bromobenzoate)
17. poly(vinyl chloride-vinylidene chloride)
18. poly[4,4'-(1-phenyl-2,2,2-trifluoroethylidene)diphenylene carbonate]
19. poly(vinyl acetate)
20. poly(vinyl acetate-co-crotonic acid)
21. poly(N-vinyl carbazole)
22. poly(N-allylcarbazole)
23. poly(3,6-dibromo-9-vinyl carbazole)
24. copolymer of N-vinyl carbazole and N-vinyl pyridine
25. poly[N-(2-p-vinylbenzoylethyl)-carbazole]
26. poly-9-(4-pentenyl)carbazole
27. poly[4-vinyl-d-(N-carbazyl)-toluene]
28. poly(sebacyltriphenylamine)
29. poly[4-(di-p-tolylamino)styrene]
30. poly(hexamethylenetriphenylamine)
31. poly(decamethylenetriphenylamine)
32. poly(vinyl-p-diphenylaminobenzaldehyde acetal-covinyl-m-bromobenzoate)
33. poly(vinyl-m-bromobenzoate-co-p-diphenylamino benzoate)
34. poly(vinyl-m-bromobenzoate-co-p-diphenylaminophenyl propionate)
35. poly[N-(acrylyl)-carbazole]

A partial listing of representative aggregating polymers are presented in Table II.

TABLE II 1. poly[4,4'-(2-norbornylidene diphenylene) carbonate]

2. poly[4,4'-(hexahydro-4,7-methanoindan-5-ylidene)-diphenylene carbonate]
3. poly(4,4'-cyclohexylidenediphenylene carbonate)
4. poly(4,4'-methylidine-bis(2-methylphenylene carbonate)
5. poly(4,4'-isopropylidine diphenylene 4,4'-isopropylidenedibenzoate)

One method of preparing the aggregate photoconductive particles of this invention involves preforming finely-divided aggregate photoconductive particles as broadly described in Gramza et al, U.S. Pat. No. 3,732,180 and simply storing these preformed aggregate photoconductive particles until it is desired to prepare the heterogeneous layer. At that time, the preformed particles may be dispersed in an appropriate coating vehicle together with the desired electrical insulating polymeric binder and coated as a layer on a suitable substrate to form a heterogeneous photoconductive element. In this method the preformed particles are formed as follows: A blend of the "non-aggregating polymer" (a) and the "aggregating polymer" (b) together with the pyrylium dye are dissolved in a halogenated solvent system in which the solubilities of the three ingredients are substantially equal. A precipitating liquid such as toluene is then added in which the interaction product of the aggregating polymer and the pyrylium dye, i.e. the aggregate photoconductive particle is insoluble. The addition of the precipitating liquid causes the aggregate photoconductive particle to precipitate. The halogenated solvent system and the precipitating liquid are separated from the precipitate. The precipitate, representing the preformed aggregate particles, is then dried and stored for dispersal in an electrically insulating polymer to form a heterogeneous photoconductive composition.

The heterogeneous photoconductive compositions containing aggregate photoconductive particles according to the present invention can also be prepared by combining a thiopyrylium dye in solution with a polymeric blend according to the present invention. The solution of dye and polymeric blend are then treated to form the aggregate as taught in the prior art. Methods of forming the solution of dye and polymers and of treating the solution to form the aggregate photoconductive particles include methods of fuming as disclosed in Light; or the so-called "dye first" technique described in Gramza et al, U.S. Pat. No. 3,615,396 issued Oct. 26, 1971; or the so-called "shearing" method described in Gramza, U.S. Pat. No. 3,615,415 issued Oct. 26, 1971; or the two-stage dilution technique described in Kryman et al U.S. Pat. No. 3,679,408 issued July 25, 1972.

In any case, by whatever method prepared, heterogeneous compositions containing the aggregate photoconductive particles and the polymeric blends according to the present invention, exhibit a separately identifiable multi-phase structure. The heterogeneous nature of this multi-phase composition is generally apparent when viewed at 2500 X magnification, although such compositions may appear to be substantially optically clear to the naked eye in the absence of magnification. The aggregate photoconductive particles in the composition are co-crystalline complexes which comprise a thiopyrylium dye and an "aggregating polymer" as defined hereinbefore for Formula I.

Pyrylium dyes (including pyrylium and thiopyrylium) which are useful in forming aggregate photoconductive particles are disclosed in aforementioned U.S. Pat. No. 3,615,414. Particularly useful dyes in forming aggregate particles are pyrylium dye salts having the formula:

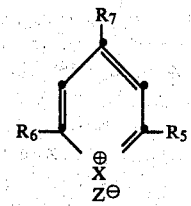

II.

wherein:
X is oxygen or sulfur;
$R_5$ and $R_6$ can each be phenyl radicals, including substituted phenyl radicals having at least one substituent chosen from alkyl radicals of from 1 to about 6 carbon atoms and alkoxy radicals having from 1 to about 6 carbon atoms;
$R_7$ can be an alkylamino-substituted phenyl radical having from 1 to 6 carbon atoms in the alkyl moiety, and including dialkylamino-substituted and haloalkylamino-substituted phenyl radicals; and
$Z^\ominus$ is an anionic function including such anions as tetrafluoroborate, hexafluorophosphate, p-toluene sulfonate, iodide, chloride, bromide, sulfate and perchlorate.

The amount of pyrylium dye salt used in forming the aggregate photoconductive particles varies. Useful results are obtained by employing the described pyrylium dyes in amounts of from about 0.001 to about 50 percent based on the dry weight of the heterogeneous photoconductive layer.

The amount of the total polymer blend used in the compositions of this invention also varies. Typically, the composition contains an amount of the polymer blend within the range of from about 20 to about 98 weight percent based on the dry weight of a layer formed from the composition, although larger or smaller amounts are also used.

Optionally, one or more photoconductors, including polymeric photoconductors may be incorporated into the heterogeneous photoconductive composition formed from the aggregate photoconductive particles of the invention. Useful photoconductors are organic, including metalloorganic, photoconductors which can be solubilized in the polymeric blend component of the composition. By employing these photoconductors in the composition, it has been found that the resultant sensitivity of the composition and the photoconductive element comprising a layer of the compositions are in some cases, enhanced.

In general, from about 5 to about 40 weight percent of organic photoconductors are useful in the compositions of this invention, although amounts outside this range will provide useful results in certain applications. The organic photoconductors preferred for use include the tri-substituted methanes disclosed in U.S. Pat. No. 3,820,989 and the triarylmethane leuco bases disclosed in U.S. Pat. No. 3,542,547, including mixtures of these photoconductors. Other useful organic photoconductors include:

1. carbazole materials including carbazole, N-ethylcarbazole, N-isopropylcarbazole, N-phenylcarbazole, halogenated carbazoles, various polymeric carbazole materials such as poly(vinylcarbazole) halogenated poly(vinylcarbazole), and the like.

2. arylamine-containing materials including monoarylamines, diarylamines, triarylamines, as well as polymeric arylamines. A partial listing of specific arylamine organic photoconductors includes the particular non-polymeric triphenylamines illustrated in Klupfel et al, U.S. Pat. No. 3,180,730 issued Apr. 27, 1965; the polymeric triarylamines described in Fox, U.S. Pat. No. 3,240,597 issued Mar. 15, 1966; the triarylamines having at least one of the aryl radicals substituted by either a vinyl radical or a vinylene radical having at least one active hydrogen-containing group as described in Brantly et al, U.S. Pat. No. 3,567,450 issued Mar. 2, 1971; the triarylamines in which at least one of the aryl radicals is substituted by an active hydrogen-containing group as described in Brantly et al, U.S. Pat. No. 3,658,520 issued Apr. 25, 1972; and tritolylamine.

3. polyarylalkane materials of the type described in Noe et al, U.S. Pat. No. 3,274,000 issued Sept. 20, 1966; Wilson, U.S. Pat. No. 3,542,547 issued Nov. 24, 1970; Seus et al, U.S. Pat. No. 3,542,544 issued Nov. 24, 1970; and in Rule et al, U.S. Pat. No. 3,615,402 issued Oct. 26, 1971. Preferred polyarylalkane photoconductors can be represented by the formula:

wherein D and G, which are the same or different, represent aryl groups and J and E, which are the same or different, represent a hydrogen atom, an alkyl group, or an aryl group, at least one of D, E and G containing an amino substituent. Especially useful as the charge transport material is a polyarylalkane having the formula noted above wherein J and E represent a hydrogen atom, an aryl group, or an alkyl group and D and G represent substituted aryl groups having as a substituent thereof a group represented by the formula:

wherein R represents an unsubstituted aryl group such as phenyl or an alkyl substituted aryl such as a tolyl group. Additional information concerning certain of these latter polyarylalkane materials is found in Rule et al, U.S. Pat. No. 4,127,412 issued Nov. 28, 1978.

4. strong Lewis base materials such as various aromatic compounds including aromatically unsaturated heterocyclic-containing materials which are free to strong electron withdrawing groups. A partial listing of such aromatic Lewis base materials includes tetraphenylpyrene, 1-methylpyrene, perylene, chrysene, anthracene, tetraphene, 2-phenylnaphthalene, azapyrene, fluorene, fluorenone, 1-ethylpyrene, acetylpyrene, 2,3-benzochrysene, 3,4-benzopyrene, 1,4-bromopyrene, phenylindole, poly(vinylcarbazole), poly(vinylpyrene), poly(vinyltetracene), and poly(vinylperylene).

5. other useful p-type charge-transport materials which are useful with the present invention are any of the p-type organic photoconductors, including metallo-organo materials, known to be useful in electrophotographic processes, such as any of the organic photoconductive materials described in U.S. Pat. No. 3,615,414 and Research Disclosure, Vol. 109, May 1973, pages 61–67, paragraph IV (A) (2) through (13) which are p-type photoconductors.

As stated hereinbefore, the aggregate photoconductive particles of the present invention can be performed for subsequent use in forming heterogeneous photoconductive compositions. In such cases, the electrically insulating polymeric component of the composition can be any suitable polymer. A partial listing of representative materials which are useful as binders are film-forming polymeric materials having a fairly high dielectric strength and good electrically insulating properties. Such binders include styrene-butadiene copolymers; vinyltoluene-styrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals), such as poly(vinyl butyral); nitrated polystyrene; polymethylstyrene; isobutylene polymers; polyesters; phenolformaldehyde resins; ketone resins; polyamides, polycarbonates, polythiocarbonates; copolymers of vinyl haloarylates and vinyl acetate such as poly(vinyl-m-bromobenzoate-co-vinyl acetate) and chlorinated poly(olefins), such as chlorinated polyethylene.

The aggregate heterogeneous photoconductive compositions may also contain other addenda such as leveling agents, surfactants, plasticizers, and the like to enhance or improve various physical properties of the layer. In addition, various addenda to modify the electrophotographic response of the element are suitable for incorporation in the composition, for example, various contrast control materials and certain spectral or chemical dyes.

When it is desirable to increase the aggregate particle size in the compositions of the invention, a small amount of a polycarbonate, such as poly(4,4'-isopropylidene) diphenylene carbonate, is added to the composition and caused to aggregate as described in Light et al. This procedure provides a means for increasing the aggregate particle sizes to a desired range.

A useful thickness for the heterogeneous photoconductive layers formed with the invention is within the range of from about 0.1 to about 15 microns dry thickness, particularly from about 0.5 to about 12 microns. However, thinner or thicker layers provide useful results. Layers may be formed from the compositions of the present invention according to the methods described in the aforementioned Light et al, Gramza et al and Kryman et al patents.

The heterogeneous photoconductive layers of the invention are suitably affixed, if desired, to a variety of electrically conducting supports to form photoconductive elements. Examples of such supports include paper (at a relative humidity above 20 percent), cermet or carbon conducting layers, aluminum-paper laminates; metal foils such as aluminum foil, zinc foil, etc; metal plates such as aluminum, copper, zinc, brass and galvanized plates; vapor deposited metal layers such as silver, nickel, aluminum and the like coated on paper or conventional photographic film bases such as cellulose acetate and polystyrene. Such conducting materials as nickel, vacuum deposited on transparent film supports in sufficiently thin layers, allow electrophotographic elements prepared therewith to be exposed from either side of such elements.

An especially useful conducting support is prepared coating a support material such as poly(ethylene terephthalate) with a conducting layer containing a semiconductor dispersed in a resin or vacuum deposited on the support. Such conducting layers are described in U.S. Pat. No. 3,245,833 by Trevoy, issued Apr. 12, 1966. Likewise, a suitable conducting coating is prepared from the sodium salt of a carboxyester lactone of maleic anhydride and a vinyl acetate polymer. Such kinds of conducting layers and methods for their optimum preparation and use are disclosed in U.S. Pat. No. 3,007,901 by Minsk, issued Nov. 7, 1961 and U.S. Pat. No. 3,262,807 by Sterman et al, issued July 26, 1966.

While the heterogeneous photoconductive layers of the invention can be affixed, if desired, directly to a conducting substrate, it may be desirable to use one or more intermediate subbing layers between the conducting substrate to improve adhesion to the conducting substrate and/or to act as an electrical barrier layer between the multi-active element and the conducting substrate as described in Dessauer, U.S. Pat. No. 2,940,348. Such subbing layers, if used, typically have a dry thickness in the range of about 0.1 to about 5 microns. Useful subbing layer materials include film-forming polymers such as cellulose nitrate, polyesters, copolymers or poly(vinyl pyrrolidone) and vinylacetate, and various vinylidene chloride-containing polymers including two, three and four component polymers prepared from a polymerizable blend of monomers or prepolymers containing at least 60 percent by weight of vinylidene chloride. Representative vinylidene chloride-containing polymers are vinylidene chloride-methyl methacrylate-itaconic acid terpolymers as disclosed in U.S. Pat. No. 3,143,421. Various vinylidene chloride containing hydrosol tetrapolymers which are useful include tetrapolymers of vinylidene chloride, methyl acrylate, acrylonitrile, and acrylic acid as disclosed in U.S. Pat. No. 3,640,708. A partial listing of other useful vinylidene chloride-containing copolymers includes poly(vinylidene chloride methacrylonitrile), poly(vinylidene chloride-acrylonitrile), and poly(vinylidene chloride-acrylonitrilemethyl acrylate). Other useful subbing materials include the so-called tergels which are described in Nadeau et al, U.S. Pat. No. 3,501,301.

One subbing layer that is especially useful in the multi-active element of the invention is a hydrophobic film-forming polymer or copolymer free from any acid-containing group, such as a carboxyl group, prepared from a blend of monomers or prepolymers, each of said monomers or prepolymers containing one or more polymerizable ethylenically unsaturated groups. A partial listing of such useful materials includes many of the above-mentioned copolymers, and, in addition, the following polymers: copolymers of polyvinylpyrrolidone and vinyl acetate, poly(vinylidene chloride-methyl methacrylate), poly(ethylene-co-neopentyl terephthalate), and the like.

Optional overcoat layers are useful with the present invention, if desired. For example, to improve surface hardness and resistance to abrasion, the surface layer of the multi-active element of the invention may be coated with one or more electrically insulating, organic polymer coatings or electrically insulating, inorganic coatings. A number of such coatings as well known in the art and accordingly extended discussion thereof is unnecessary. Several such overcoats are described, for example, in Research Disclosure, "Electrophotographic Elements, Materials, and Processes", Vol. 109, page 63, Paragraph V, May, 1973, which is incorporated by reference herein.

The layers of the present invention are employed as single layer photoconductive elements or as one of the charge generating layers in so-called multi-active photoconductive elements. The latter elements comprise at least two layers, including a charge generating layer and a charge transport layer such as disclosed in U.S. Pat. No. 4,175,960 issued Nov. 27, 1979 by Berwick et al. The compositions of the present invention can be used to advantage as the charge-generating layer in such multiactive elements.

Such photoconductive elements are useful in a wide variety of known electrophotographic imaging processes. One such process is the xerographic process. In a process of this type, an electrophotographic element held in the dark is given a blanket electrostatic charge by placing it under a corona discharge to give a uniform charge to the surface of the photoconductive layer. This charge is retained by the layer owing to its substantial dark insulating property. In other words, the layer has low conductivity in the dark. The electrostatic charge formed on the surface of the photoconductive layer is then selectively dissipated from the surface of the layer by imagewise exposure to light by means of a conventional exposure operation. Examples of exposure techniques include a contact-printing technique, lens projection of an image, and the like. Exposing the surface in this manner forms a latent electrostatic image on the layer which may then be developed by well known techniques.

The following examples are presented to further illustrate and clarify the invention

EXAMPLE 1

In order to compare the size distribution of aggregate photoconductive particles according to the present invention, with that of previously described aggregate photoconductive particles, the following procedure was used. Surface view color photomicrographs of the following coatings were taken at a magnification of 1870 X.

(1) A coated heterogeneous photoconductive composition using Polymer 1 of Table II to form the aggregate photoconductive particles was prepared as disclosed in Example 1 of U.S. Pat. No. 3,679,408.

(2) A coated heterogeneous photoconductive composition using bisphenol A polycarbonate alone to form the aggregate photoconductive particles was prepared as disclosed in Example 1 of U.S. Pat. No. 3,679,408.

(3) A coated heterogeneous photoconductive composition having aggregate photoconductive particles dispersed in a polymeric blend according to the present invention was prepared according to Example 3 of U.S. Pat. No. 3,615,396 by Gramza et al. This blend included 7 percent of Polymer 1, Table II plus 93 percent of Polymer 4, Table I.

Electrophotographic copies of these color photomicrographs were made in order to increase the contrast between the aggregate particles and the surrounding medium. Each particle in the photomicrograph was then measured by hand in millimeters, counted and categorized according to size. In some cases where, for example, the aggregate particle was oblong or elongated, the length of the particle and its smallest diameter was measured. The length and this diameter were added together and divided by two. The result was considered the size of the aggregate particle. Also, in cases where it was difficult to determine accurately the boundaries of the particles, the apparent particle size was measured. This means that a cluster of aggregate particles was considered as being one particle. Measurements, taken in millimeters at about 1870 X magnification, were multiplied by a factor of 0.53 to convert from millimeters to microns. Each measurement was rounded off to the nearest micron. In situations where the particle sizes were extremely small, only the particles appearing in a portion of the photomicrograph were actually measured, counted and categorized according to size. For an example, if only 25 percent of the photomicrograph was evaluated, each size category was multiplied by 4. Thus the size distribution for the entire photomicrograph could be determined. The number of particles in each particle size category was tabulated as reported in Table III.

Results are tabulated in Table III. The data of Table III shows that the predominant aggregate particle size in the heterogeneous photoconductive composition of the invention (composition 3), is less than about 1 micron with no aggregate particles having a size greater than 3 microns. On the other hand, compositions 1 and 2 have extremely few aggregate particles having a size less than 1.0 micron. The predominant size in these compositions is about 2 microns with a significant number of particles larger than 2 microns.

TABLE III

| Average Particle Size ($\mu$) | Size Distribution of Aggregate Photoconductive Particles | | |
|---|---|---|---|
| | (1) Polymer 1 (Control) | (2) Bisphenol-A Polycarbonate | (3) 7% Polymer 1 Table II + 93% Polymer 4 Table I |
| <1 | 2 | 10 | 400 |
| 1 | 50 | 84 | 80 |
| 2 | 223 | 108 | 8 |
| 3 | 13 | 28 | 8 |
| 4 | 4 | 14 | 0 |
| 5 | 1 | 10 | 0 |
| 6 | 0 | 2 | 0 |
| 7 | 0 | 0 | 0 |
| 8 | 0 | 2 | 0 |
| 9 | 1 | 0 | 0 |
| 10 | 1 | 0 | 0 |
| 11 | 1 | 0 | 0 |
| 12 | 0 | 0 | 0 |

EXAMPLES 2–6

The following basic formulation was used in Examples 2–6 to demonstrate the unexpected results obtained with the present invention.

| Component | (Parts by Weight) |
|---|---|
| Polymer blends of the present invention. | 60 |
| Organic photoconductor 4,4'-benzylidenebis(N,N-diethyl-m-toluidine) | 40 |
| Sensitizer 2,6-diphenyl-4-(4-dimethyl aminophenyl) thiopyrylium perchlorate | 2 |

Coating compositions of the various formulations were prepared according to Example 3 as disclosed in U.S. Pat. No. 3,615,396 by Gramza et al. Hand coatings were made using a 5-mil coating blade and a 0.4 optical density nickel coated polyester film support. The dry coating coverage of each coated layer was about 10$\mu$ thick.

A solvent fuming treatment was required for aggregation except when polymer 3 of Table I was used in the blend. Blends using polymer 3 aggregated spontaneously. In the fuming treatment, the coated formulation was taped to a glass plate and placed face down over a glass crystallizing dish containing a solvent. A gap of approximately 0.5 cm was maintained between the coating and solvent surface. Fuming times on the order of five minutes were used. The fuming solvent used was dichloromethane (MeCl$_2$).

Observations again showed that the predominant aggregate photoconductive particle size for the layers of the invention was less than about 1.0$\mu$. The particle size in the control was between 1 and 2$\mu$. The data of Table IV shows that the particle size of the various blends is generally less than 1.0$\mu$. The highest particle size in the table is 2$\mu$. In many cases the predominant particle size is 0.5$\mu$ or less. The particle sizes were measured as in Example 1.

TABLE IV

| | Size of Aggregate Photoconductive Particles in Various Polymeric Blends | | | |
|---|---|---|---|---|
| Example No. | Table I Polymer | + | Table II Polymer | Particle Size (microns) |
| 2 | — | | Polymer 1 (Control) | 1–2 |
| 3 | Polymer 1 | + | 10% Polymer 1 | <0.5-rare* 1.0 |
| | Polymer 1 | + | 5% Polymer 1 | <0.5 (hard to resolve) |
| | Polymer 1 | + | 2.5% Polymer 1 | ** |
| | Polymer 1 | + | 0% Polymer 1 | Dye Crystals (no aggregation) |
| 4 | Polymer 2 | + | 10% Polymer 1 | <0.5-rare* 2 |
| | Polymer 2 | + | 5% Polymer 1 | <0.5 (hard to resolve) |
| | Polymer 2 | + | 2.5% Polymer 1 | ** |
| | Polymer 2 | + | 0% Polymer 1 | Dye Crystals (no aggregation) |
| 5 | Polymer 4 | + | 10% Polymer 1 | <0.5-rare* 2.0 |
| | Polymer 4 | + | 5% Polymer 1 | <0.5 (hard to resolve) |
| | Polymer 4 | + | 2.5% Polymer 1 | ** |
| | Polymer 4 | + | 0% Polymer 1 | (no aggregation) |

TABLE IV-continued

Size of Aggregate Photoconductive Particles in Various Polymeric Blends

| Example No. | Table I Polymer | + | Table II Polymer | Particle Size (microns) | |
|---|---|---|---|---|---|
| 6 | Polymer 3 | + | 10% Polymer 1 | 0.5–2 | predominant particle size less than 1.0μ. |
|   | Polymer 3 | + | 5% Polymer 1 | 0.5–2 | |
|   | Polymer 3 | + | 2.5% Polymer 1 | 0.5 | |
|   | Polymer 3 | + | 0% Polymer 1 | Dye Crystals (no aggregation) | |

*Only a very few particles having the indicated size were observed.
**Appears homogeneous at 2500×.

EXAMPLES 7–12

Six additional heterogeneous photoconductive compositions containing polymeric blends according to this invention were prepared as in Examples 2–6. The resulting size of the aggregate photoconductive particles in each blend is presented in Table V. Particle size was measured as in Example 1.

TABLE V

Size of Aggregate Photoconductive Particles in Various Polymeric Blends

| Example No. | Table I Polymer | + | Table II Polymer | Particle Size (microns) |
|---|---|---|---|---|
| 7 | Polymer 4 | + | 0.5% Polymer 1 | <<0.5–0.5μ |
| 8 | Polymer 4 | + | 2.5% Polymer 1 | <<0.5–0.5μ |
| 9 | Polymer 4 | + | 5.0% Polymer 1 | <<0.5–0.5μ |
| 10 | Polymer 3 | + | 0.5% Polymer 1* | 0.5μ |
| 11 | Polymer 3 | + | 2.5% Polymer 1* | 0.5μ |
| 12 | Polymer 3 | + | 5.0% Polymer 1* | 0.5–2.0μ (predominant particle size less than about 1.0μ.) |

*Polystyrene-based binder produced aggregation upon coating.

EXAMPLES 13–28

Sixteen (16) different polymeric blends were prepared. Each blend was used to prepare, according to Examples 2–6, 16 different heterogeneous photoconductive compositions. The basic formulation consisted of, on a weight to weight basis, 3.4% of polymer 1 of Table II; 30% of 4,4'-diethylamino-2,2'-dimethyltriphenylmethane; 2% of 4-p-dimethylaminophenyl-2,6-diphenyl thiopyrylium perchlorate and 64.6% of one of polymers 5–20 of Table I.

In each of the 16 heterogeneous photoconductive compositions very fine aggregate photoconductive particles observed were consistent with the particle sizes observed in the layers of the invention in Examples 1–6.

EXAMPLES 29–30

Two different polymeric blends were prepared. Each blend was used to prepare a heterogeneous photoconductive composition as in Examples 2–6. The resulting photoconductive compositions consisted of 3.4% of either polymer 2 or polymer 3 from Table I; 30% 4,4'-diethylamino-2,2'-dimethyltriphenylmethane; 2% of 4-p-dimethylaminophenyl-2,6-diphenyl thiopyrylium perchlorate and 64.6% polymer 3 from Table II. Very fine grain aggregate particles were observed consistent in size with aggregate particles observed in the layers of the invention of Examples 1–6.

EXAMPLES 31–33

Three (3) different polymeric blends were prepared containing photoconductive non-aggregating polymer 21, Table I (poly(n-vinylcarbazole) and 2.5, 5.0 and 10% of polymer 1, Table II. Each blend was used to prepare three different heterogeneous photoconductive compositions according to Examples 2–6 except that no photoconductor other than polymer 21 was used. Each blend exhibited very fine aggregate photoconductive particles consistent in size with the particles observed in the layers of the invention in Examples 1–6.

EXAMPLES 34–37

Four (4) different heterogeneous photoconductive compositions were prepared as in Examples 2–6. Each composition included 40 parts by weight of 4,4'-benzylidene(N,N-diethyl-m-toluidine). Other components of the compositions were as follows:

| | Polymeric Blend | | |
|---|---|---|---|
| Example | Table I Polymer | Table II Polymer | Dye Sensitizer |
| 34 | 50% Polymer 4 | 50% Polymer 1 | 4-p-dimethylaminophenyl-2,6-diphenylpyrylium p-toluene sulphonate |
| 35 | 90% Polymer 4 | 10% Polymer 1 | |
| 36 | 50% Polymer 4 | 50% Polymer 1 | A mixture consisting of 70% of the pyrylium dye used in Examples 34 and 35 plus 30% 4-p-dimethylaminophenyl-2,6-diphenyl-thiapyrylium ClO$_4^-$ |
| 37 | 90% Polymer 4 | 10% Polymer 1 | |

Very fine aggregate photoconductive particles having sizes consistent with the aggregate particles measured in Examples 1–6 were observed.

The invention has been described in detail with particular reference to certain preferred embodiments thereof, but it will be understood that variations and modifications can be effected within the spirit and scope of the invention.

I claim:

1. In a method for the preparation of a heterogeneous photoconductive composition capable of high resolution wherein a thiopyrylium dye is combined in solution with an electrically insulating polymer to form photoconductive aggregate particles, the improvement wherein the thiopyrylium dye is combined in solution with an electrically insulating polymeric blend consisting of:

(a) from about 50.0 to about 99.9 weight percent of a non-aggregating polymer effective to reduce particle size and particle size distribution of the aggregate particles formed in said blend and (b) from about 0.1 to about 5.0 weight percent of an aggregating polymer having repeating units according to the structure:

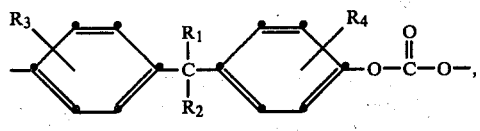 I.

wherein:

$R_1$ and $R_2$, taken separately are the same or different, and represent hydrogen or alkyl; or $R_1$ and $R_2$ taken together, represent the carbon atoms necessary to form a cyclic hydrocarbon radical having up to 14 ring carbon atoms; and $R_3$ and $R_4$ represent hydrogen or alkyl;

provided that when $R_1$ and $R_2$ are both methyl, $R_3$ and $R_4$ must be other than hydrogen.

2. A method as in claim 1, wherein said non-aggregating polymer is selected from the group consisting of:
  (a) poly[(4,4'-alkylidene bis(aryleneoxy-p-arylene)-sulfones)];
  (b) addition polymers and copolymers having pendant from at least 10% of the repeating units thereof a group selected from the class consisting of aryl, alkyl, acetate, aryl substituted acetals, halogen, halobenzoate, hydroxyl, and carboxyl, the aforesaid repeating units being derived from a compound having a polymerizable ethylenically unsaturated alkylene group containing about two to four carbon atoms;
  (c) polymers and copolymers having at least about 10% of the repeating units comprising a photoconductive component selected from the group consisting of substituted and unsubstituted carbazoles and substituted and unsubstituted triarylamines;
  (d) poly(4,4'-alkylidene-bis-2,2',6,6'-tetrahalo diarylene carbonates);
  (e) polyester polymers and copolymers derived from one or more aryldicarboxylic acids and one or more polyols selected from the group consisting of alkylene glycols; 4,4'-alkylidenediarylenediols; 4,4'-alkylidenediaryleneoxyalkylenediols; 4,4'-polycycloalkylidenediarylenediols and 4,4'-polycycloalkylidenediaryleneoxyalkylenediols including esters of such acids and polyols; and
  (f) poly[4,4'-(1-phenyl-2,2,2-trifluoroethylidene)-diphenylene carbonates].

3. A method as in claim 1, wherein said polymeric blend consists of:
  (a) from about 50 to about 99.9 weight percent of a non-aggregating polymer selected from the group consisting of poly[4,4'-(hexahydro-4-7-methanoindan-5-ylidene)diphenyl terephthalate]; poly[4,4'-isopropylidene bis(phenyleneoxy-p-phenylene)sulfone]; polystyrene; poly(4,4'-isopropylidene bis-phenoxyethyl-co-ethylene terephthalate); halogenated polyethylene; poly(vinylchloridevinylidene chloride; poly[4,4'-(1-phenyl-2,2,2-trifluoroethylidene)diphenylene carbonate]; polyvinyl acetate; poly(alkylmethacrylate); poly(vinylacetate-co-crotonic acid) and poly(N-vinylcarbazole); and
  (b) from about 0.1 to about 10 weight percent of an aggregating polymer selected from the group consisting of poly[4,4'-(2-norbornylidene)diphenylene carbonate]; poly[4,4'-(hexahydro-4,7-methanoindan-5-ylidene)diphenylene carbonate], and poly(4,4'-cyclohexylidene diphenylene carbonate).

* * * * *